US009958338B2

(12) United States Patent
Guenther et al.

(10) Patent No.: US 9,958,338 B2
(45) Date of Patent: May 1, 2018

(54) THERMOCOUPLE WITH A HEATER ON A SUBSTRATE

(75) Inventors: Herbert Guenther, Allendorf (DE); Siegrid Sommer, Burgwald (DE); Stefan Sommer, Burgwald (DE); Frédéric Zimmermann, Nürnberg (DE)

(73) Assignee: GUENTHER Heisskanaltechnik GmbH, Frankenberg (DE)

( * ) Notice: Subject to any disclaimer, the term of this patent is extended or adjusted under 35 U.S.C. 154(b) by 943 days.

(21) Appl. No.: 14/353,857

(22) PCT Filed: Aug. 2, 2012

(86) PCT No.: PCT/EP2012/065202
§ 371 (c)(1),
(2), (4) Date: Jul. 25, 2014

(87) PCT Pub. No.: WO2013/060496
PCT Pub. Date: May 2, 2013

(65) Prior Publication Data
US 2014/0334524 A1 Nov. 13, 2014

(30) Foreign Application Priority Data
Oct. 25, 2011 (DE) .................. 10 2011 054 803

(51) Int. Cl.
*G01K 7/04* (2006.01)
*G01K 7/02* (2006.01)
*H05B 3/48* (2006.01)

(52) U.S. Cl.
CPC .............. *G01K 7/028* (2013.01); *G01K 7/02* (2013.01); *H05B 3/48* (2013.01)

(58) Field of Classification Search
CPC combination set(s) only.
See application file for complete search history.

(56) References Cited

U.S. PATENT DOCUMENTS

| 4,415,758 A * | 11/1983 | Lacoste | G01T 3/006 |
| | | | 136/232 |
| 6,215,137 B1 * | 4/2001 | Suzuki | B82Y 35/00 |
| | | | 257/253 |

(Continued)

FOREIGN PATENT DOCUMENTS

| CA | 2 232 737 | 9/1998 |
| DE | 14 14 604 | 1/1969 |

(Continued)

OTHER PUBLICATIONS

Duby S. et al., "Printed thick-film thermocouple sensors", Electronics Letters, GB, vol. 41, No. 6, Mar. 17, 2005, pp. 312-314, XP006023651.

*Primary Examiner* — Lisa Caputo
*Assistant Examiner* — Nasir U Ahmed
(74) *Attorney, Agent, or Firm* — Clark & Brody

(57) ABSTRACT

The invention relates to a thermocouple for sensing the temperature at a measurement point, comprising a first conductor that has a first end and a first terminal, and a second conductor that has a second end and a second terminal. The first end of the first conductor and the second end of the second conductor are in electric contact with one another at the measurement point, while the first terminal of the first conductor and the second terminal of the second conductor can each be connected to a terminal line. The first conductor and the second conductor are applied to a substrate using thick-film technology, the first end of the first conductor and the second end of the second conductor overlapping in at least some sections at the measurement point. A hot runner nozzle has a heater and a thermocouple according to the invention.

14 Claims, 6 Drawing Sheets

(56) References Cited

U.S. PATENT DOCUMENTS

| | | | |
|---|---|---|---|
| 6,797,925 B1 | 9/2004 | Günther et al. | |
| 7,280,750 B2 * | 10/2007 | Russegger | B29C 45/2737 392/465 |
| 2007/0086759 A1 * | 4/2007 | Russegger | B29C 45/2737 392/473 |
| 2010/0003358 A1 * | 1/2010 | Gunther | B29C 45/2737 425/144 |

FOREIGN PATENT DOCUMENTS

| | | |
|---|---|---|
| DE | 28 07 794 | 8/1978 |
| DE | 196 36 232 | 5/1997 |
| DE | 198 14 106 | 10/1998 |
| DE | 198 16 941 | 10/1999 |
| DE | 198 06 110 | 1/2001 |
| DE | 199 41 038 | 3/2001 |
| DE | 10 2005 009 927 | 12/2005 |
| DE | 10 2006 049 667 | 4/2008 |
| DE | 10 2006 005 596 | 7/2008 |
| DE | 20 2010 011 405 | 10/2010 |
| EP | 1 206 900 | 10/2004 |
| JP | 06-104494 | 4/1994 |
| JP | 08-193891 | 7/1996 |
| WO | 2008/101171 | 8/2008 |

* cited by examiner

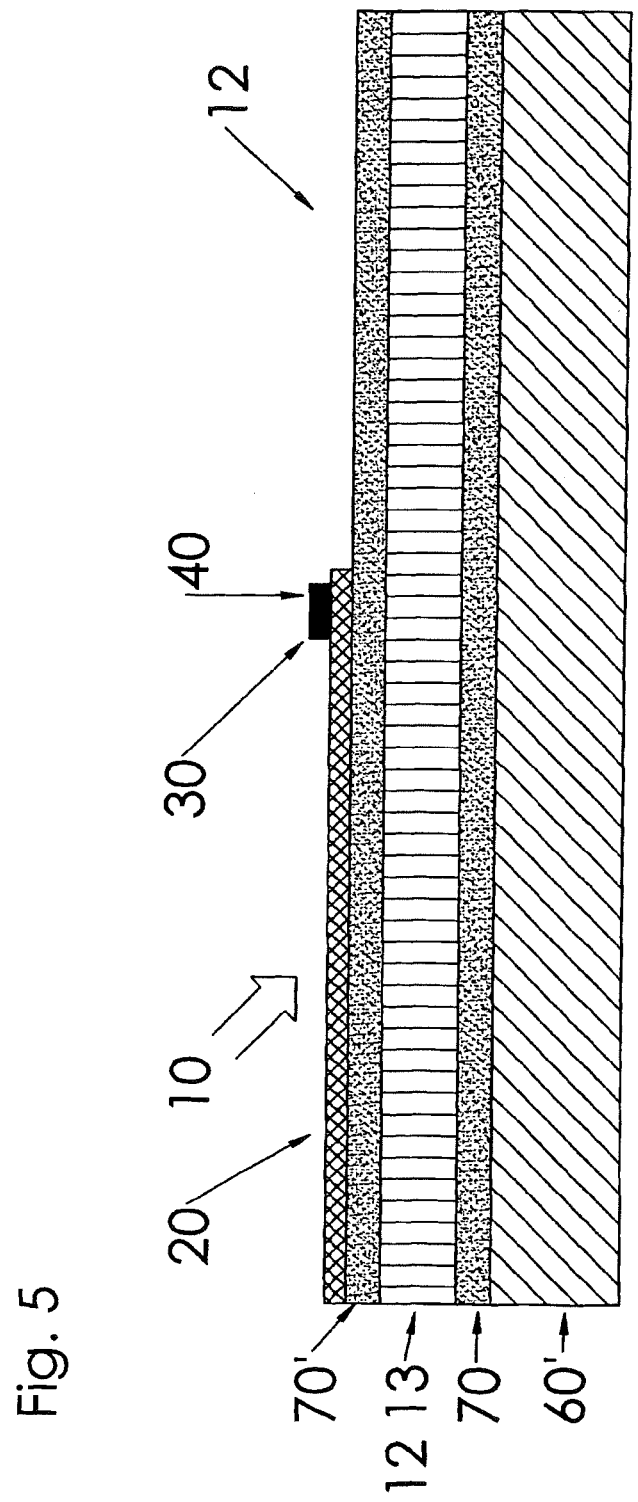

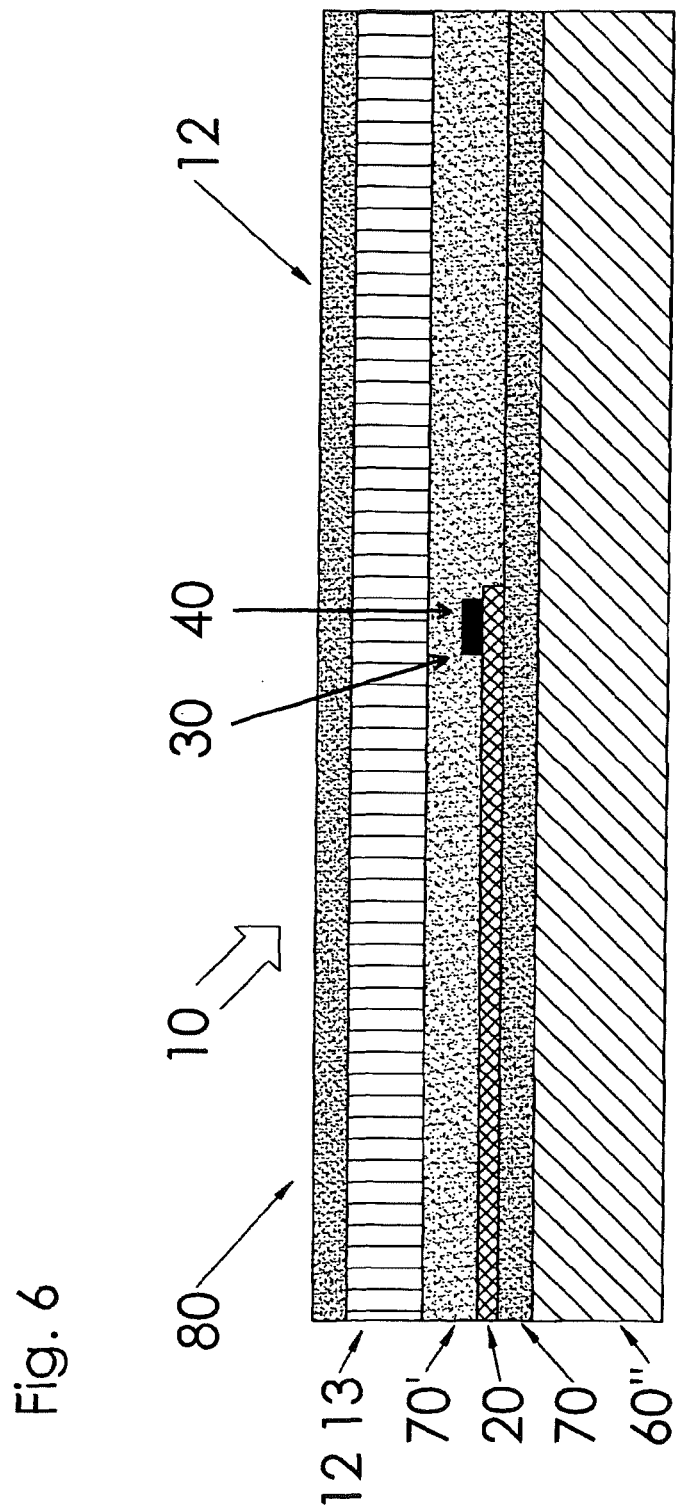

THERMOCOUPLE WITH A HEATER ON A SUBSTRATE

The invention relates to a thermocouple for sensing the temperature, as well as a hot runner nozzle.

Temperature sensing by means of thermocouples in technical devices often poses great challenges. On the one hand, the thermocouple must be disposed at a certain location of the device in order to be able to detect the temperature exactly at that precise location and register any temperature changes in this area of the device immediately when they happen, insofar as possible. On the other hand, the thermocouple must take up a minimal amount of space, because such space is either not available or needed for other technical means.

Measuring temperature differences with thermocouples is generally known in the art. Such a thermocouple usually has two electrical conductors made of different metallic alloys or metals that are brought into contact with one another at the measurement point. The measurement of the temperature is based on the measurement of a thermoelectric voltage. The same is generated by the conversion of thermal energy into electrical energy due to the temperature differences at the measurement point according to the Seebeck effect. Thermocouples are preferably used in sensors or temperature sensing units and usually compliant with a standard according to DIN IEC 584, at the current time.

DE 10 2005 009 927 A1 discloses a so-called mineral-insulated metal-sheathed thermocouple. The metallic conductors of same are disposed inside a protective sheathing that is usually made of stainless steel, and wherein the two conductors are electrically insulated by means of a magnesium or aluminum oxide filling. It is disadvantageous therein that the thermocouples are very susceptible to bending and kinking; kinking may even functionally disable the thermocouple. The space requirements of such thermocouples can indeed be quite minimal, when they are matched with wires of diameters of up to 0.5 mm thickness. However, the thinner such mineral-insulated metal-sheathed thermocouples are, the lower is their mechanical stability, such that the risk of mechanical deformation, and thereby defects, increases. Larger diameters of the mineral-insulated metal-sheathed thermocouples, on the other hand, result in a larger thermal mass and are, therefore, indicative of more inert or longer reaction times, such that temperature changes can only be sensed with a time delay.

Therefore, it is the object of the present invention to avoid these and other disadvantages of the prior art and to provide a thermocouple that, while having minimal space requirements, will always exactly and reliably sense a temperature difference or a temperature, and that offers, moreover, a high level of mechanical stability along with a cost-effective construction. Another object is a simple and cost-effective method for producing such a thermocouple with the capacity of being applied to different materials. The thermocouple is also intended to cover a temperature range that is as large as possible and provide the capacity of sensing voltage differences inside the usable temperature range that are as great as possible, and with temperature changes that are as minimal as possible.

The main features of the invention are captured in the characterizing portions of claim 1 and claim 16. Embodiments are the subject-matter of claims 2 to 11 and 12 to 15.

In a thermocouple for sensing the temperature at a measurement point having a first conductor, which has a first end and a first terminal, and having a second conductor, which has a second end and a second terminal, wherein the first end of the first conductor and the second end of the second conductor are in electric contact with one another at the measurement point, and wherein the first terminal of the first conductor and the second terminal of the second conductor can each be connected to the a terminal line, the invention provides that the first conductor and the second conductor are applied to a substrate by means of thick-film technology, and wherein the first end of the first conductor and the second end of the second conductor are touching at the measurement point or overlapping at least in sections.

A thermocouple of this kind has extremely low space requirements, because the conductors are applied to the substrate by means of thick-film technology and the layer thickness of the conductor is only a few micrometers. Correspondingly, the dimensions of the thermocouple are prescribed to a determinative degree by the substrate itself; this means that the dimensions change only immaterially due to the application of the conductor by way of the thick-film technology, thereby precluding any additional space requirement. In addition, the substrate provides the thermocouple with a high level of stability, because the conductors that are applied to the substrate cannot be damaged, even when they are exposed to great stresses.

Thick-layer technology is a precise and cost-effective modality for applying the conductors to the substrate, which has a positive effect on production costs, on the one hand, and provides a high level of measurement accuracy, on the other hand. In particular, owning to the small mass, the thermocouple according to the invention has extremely short reaction times, whereby the temperatures can be sensed directly on site and in real time. Even minimal temperature fluctuations are detectable almost without delay. Correspondingly, the thermocouple with the conductors that are configured in thick-film technology covers a relatively large temperature range, and wherein a large voltage difference is generated within the usable temperature ranges at minimal temperature changes.

The configuration of the conductor on the substrate by means of thick-film technology further allows for creating an exact measurement point, such that there is the possibility of being able to ascertain the temperature at one precisely defined point, and whereby reproducible and accurate measurement results are obtained. Moreover, in terms of production, the thermocouple according to the invention is easy and cost-effective to manufacture, without great material consumption.

The minimal dimensions of the thermocouple according to the invention allow for a space-saving, accurate and point-by-point measurement of the temperature across a wide temperature range. This suggests numerous options for the use for the device. For example, the thermocouples can be used in plastics processing, particularly in hot runner systems at temperatures between room temperature and 500° C., in that the thermocouple is mounted directly to the heater of a hot runner nozzle or to the material pipe thereof. However, the thermocouple according to the invention is also suitable for applications in low temperature ranges to −200° C. and below, as well as above 500° C.

One embodiment of the invention provides that the first conductor constitutes a positive contact and is manufactured of an alloy made of 80% to 95% Ni, 3% to 20% Cr, 0% to 1% Fe and 0% to 1% Si. One composition of the aforementioned alloys is known commercially under the brand name Chromel® or ISATHERM PLUS®. Furthermore, the second conductor constitutes a negative contact and is manufactured, for example, of an alloy made of 40% to 58% Cu, 40% to 50% Ni, 1% to 5% Mn and 1% to 5% Fe. One composition of these alloys is known commercially under the brand name ISA MINUS®.

These alloys facilitate constant and reproducible temperature measurements as well as the output of a DIN-compliant measured signal. This way, the obtained measured values are comparable to measured values taken with other standardized temperature sensors. This is significant insofar as the different standardized thermocouples differ, due to the varying contact materials, in terms of the maximum thermoelectric voltage that can be generated, and therefore also in the critical temperature ranges thereof. Said ranges are characteristic for each individual thermocouple and are the range inside which the thermocouples supply stable thermoelectric voltages without incurring damage to the contact materials due to heat, which would prevent a reproducible thermoelectric voltage.

Preferably, the first terminal line of the first conductor and the second terminal line of the second conductor are made of the same material as the respective conductors. This ensures a stable measured signal.

A further embodiment of the invention provides for disposing an electrical insulation layer between an electrically conducting substrate and the conductors. This allows for a layered structural assembly of the thermocouple on a metallic substrate, and without any risk of interference with the thermocouple or the voltage change by providing that the current can dissipate via the metallic substrate. Particularly advantageously, the insulation layer is a dielectric layer. Such a layer is easily and cheaply created with thick-film technology.

A further advantage results when a cover layer is applied, at least in sections, over the conductors and the insulation layer, whereby the conductors are protected against environmental influences and damage due to scratching or oxidation. It is expedient for the cover layer to be made of a dielectric as well.

Furthermore, by overlapping the contacts of the thermocouple, it is also possible to facilitate a conducting connection via the dielectric layer of the contacts of the temperature sensor with the substrate, thereby achieving electrical grounding of the thermocouple.

If the thermocouple is mounted on a substrate, it is particularly advantageous for the substrate to be manufactured of a thermally conducting material, such that the temperature change that must be sensed can be forwarded for the most part without delay, and such that it is possible for the thermocouple to determine the temperature change quickly and precisely. In this design configuration, the substrate constitutes a carrier element for the thermocouple. This way, the thermocouple is provided with the same stability as the substrate.

A further advantageous embodiment of the invention provides that a heater is or will be mounted to the substrate by means of thick-film technology. Correspondingly, this means that the heater is mounted using the same technology as for the thermocouple, whereby it is possible to use the identical production steps. This reduces the time expenditure as well as the manufacturing costs, ultimately, and not least of all, because it is possible to use standardized production steps from the thick-film technology field.

In a further embodiment of the invention, the substrate is at least a part of a hot runner nozzle, such that the conductors of the thermocouple are mounted on the nozzle or heater thereof. This way, it is possible to equip the hot runner nozzle directly with a thermocouple, and the temperature can be sensed at an exactly defined point on the hot runner nozzle without any measurement delays. In these cases, the substrate of the thermocouple constitutes either the hot runner nozzle itself, or the heater thereof. Due to the fact that the conductors are applied by means of thick-film technology, the dimensions of the hot runner nozzle or heater thereof are not noticeably modified, such that the thermocouple itself does not take up any remarkable amount of space. Moreover, the conductors, applied via thick-film technology, ensure fast and exact temperature sensing at a precisely defined measurement point on the hot runner nozzle or heater thereof, respectively.

Correspondingly, in an improvement of the invention, the substrate of the thermocouple according to the invention can be a material pipe of the hot runner nozzle that conveys the molten material to the outlet opening of the hot runner nozzle. The material pipe thus serves as supply means of the material that is to be processed to a molding cavity, wherein it is particularly significant that the material is maintained at a constant temperature inside the totality of the material pipe. Said temperature can be detected exactly and without any great space requirement by means of the thermocouple according to the invention.

According to a further embodiment of the invention, the substrate of the thermocouple is a heater or a heating element of the hot runner nozzle. On this structural assembly, the thermocouple is mounted by means of thick-film technology directly below or above the heater of the hot runner nozzle. This facilitates taking the temperature of the heater or the environment thereof directly a defined points; exact determination and control, for example, of the thermal output of the heater are thus possible. Moreover, the temperature can be sensed directly on the heater in order to thereby control the same directly and precisely. It is advantageous therein when the conductor of the thermocouple is configured directly on the heating conductors or heat-conductive tracks. These tracks can also be formed via thick-film technology, which is beneficial for the structural height of the heater, as the heater does not undergo any substantial changes neither due to the heat-conductive tracks nor due to the conductors of the thermocouple. This way, it is possible to combine the advantages of the thick-film heater with those of the thermocouple that is applied via thick-film technology. Manufacturing costs can be lowered because the thermocouple is mounted by the same technology. Furthermore, miniaturization of the heat runner nozzle is facilitated, because the thin-film heater and the thermocouple only have minimal space requirements, and wherefore no additional assembly component is necessary. The otherwise common welded-on additional wire sensor for the detection of the temperature is also omitted, since the thermocouple is mounted directly on the hot runner nozzle and/or the heater thereof.

From a structural assembly aspect, it is beneficial when the conductor of the thermocouple and the resistive tracks are separated from each other by mechanical slots or grooves. The result is a reliable thermal and electrical separation of the thermocouple from the active resistive tracks. Thus, it is possible to sense the temperature in the direct proximity of the heater without having to measure the temperature directly against, on or under the heater, a fact that can be important in a great number of applications. The slots or grooves can be incorporated by simple means and do not influence the space requirements for the thermocouple.

Proven to be a particularly advantageous embodiment of the invention is a thermocouple having a first conductor that is manufactured of an alloy made of 89.1% Ni, 10% Cr, 0.5% Si and 0.4% Fe, and having a second conductor that is manufactured of an alloy made of 51% Cu, 45% Ni, 2% Mn and 2% Fe. The raw material that was used for the first conductor is commercially available under the brand name ISATHERM PLUS® and was purchased from the company Isabellenhütte Heusler GmbH & Co KG, Dillenburg, Germany; in the same manner, the raw material for the second conductor is commercially available under the brand name ISA MINUS®. The chemical composition of the alloys is indicated in mass proportions (mass percent) of each of the respective elements.

Further possibilities are material combinations including the alloys ISA MINUS® with ISA PLUS®, ISATHERM MINUS® with ISATHERM PLUS® and ISATHERM MINUS® with ISA PLUS®, which were also purchased from Isabellenhütte Heusler GmbH & Co KG, Dillenburg, Germany.

The invention further provides a hot runner nozzle with a heater that has a thermocouple according to the invention disposed or mounted thereupon. In particular, when working with a hot runner nozzle, it is important to be able to determine the temperature of the material that must be processed exactly in order to thus ensure optimal processing of the mass that must be processed. In the structural assembly of the hot runner nozzle according to the invention, it is possible to envision that the thermocouple for determining the temperature be mounted in an extremely space-saving manner at a precisely defined measurement point, preferably in the tip region of the hot runner nozzle. This structural arrangement facilitates exact temperature monitoring and controlling.

Due to the fact that the thermocouple has a very fast reaction time, it is possible to detect temperature changes at the hot runner nozzle in real time. This allows for ensuring optimum processing temperatures for the material inside the hot runner nozzle, which is extremely beneficial for the production conditions. Temperature sensing in the proximity of the heater also constitutes a preferred structural design for the invention, because, this way, the output of the heater can be exactly controlled by means of the actually prevailing temperature, and wherein the thermocouple according to the invention senses the temperature.

To this end, the invention further envisions the heater as a thick-film heater with resistive tracks, wherein the thermocouple is disposed over, under or in the same plane as the resistive tracks. This arrangement allows for many configurations of the hot runner nozzle that can be easily adapted for different conditions of use. The resistive tracks of the thick-film heater and the conductor of the thermocouple can be applied simultaneously or consecutively in a certain order of each other and in relation to one another, which is beneficial for the later behavior of the thermocouple, in particular, when the same is disposed upstream of the resistive tracks of the thick-film heater on the substrate.

An insulation layer that is disposed between the heater and the thermocouple prevents adulterations during the sensing of the temperature, due to voltage shifts that can occur because of the electrical heater and the different heat outputs of the heater.

A cover layer that is disposed on top of the heater protects the thermocouple as well as the heater of the hot runner nozzle against damage or external environmental influences, such as scratches, corrosion or oxidation. In addition, the cover layer acts as a thermal insulator relative to the environment.

Further characteristics, details and benefits of the invention can be derived from the specified wording of the claims as well as from the description of the embodiments below, as illustrated in the drawings below:

FIG. 5 shows a partial cross-section of a thick-film heater of another embodiment of a thick-film heater according to the invention, seen in a schematic view; and FIG. 6 shows a partial cross-section of a hot runner nozzle with a thermocouple according to the invention, seen in a schematic view.

Same reference signs refer to identical or same-type structural components.

Figure 1:
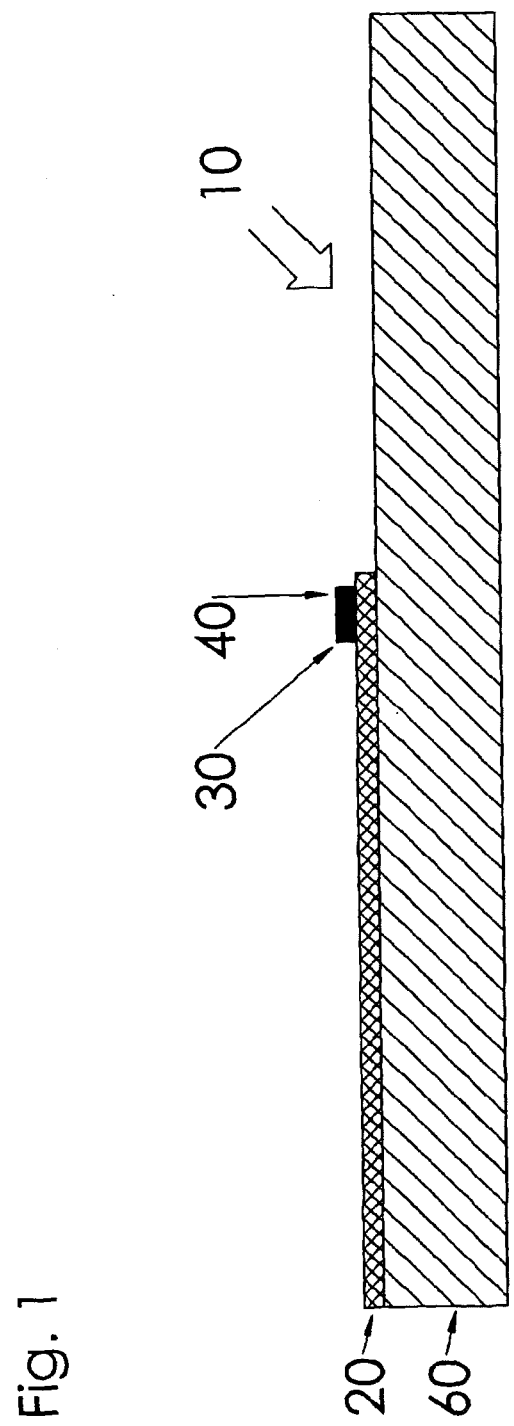
FIG. 1 shows a partial cross-section of a thermocouple according to the invention, seen in a schematic view.

The thermocouple that is generally identified by the numeral 10 in FIG. 1 is provided for sensing the temperature at the measurement point 40. It includes a substrate 60 as a carrier element, as well as two metallic conductors 20, 30 that are applied to the substrate 60 by means of thick-film technology, and wherein the two conductors 20, 30 overlap at the measurement point 40 at least in sections or in part, respectively.

Figure 2:
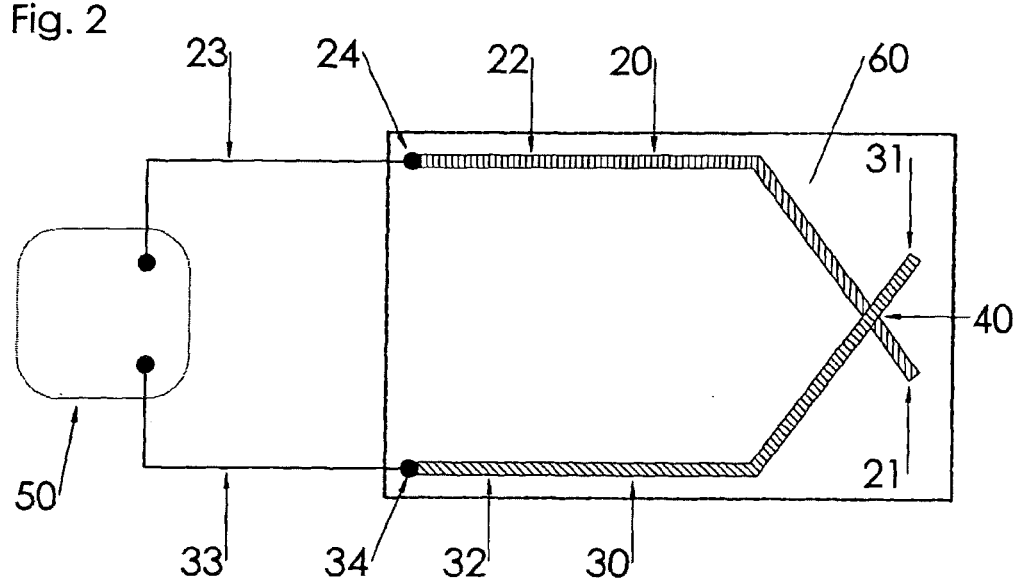
FIG. 2 shows a schematic depiction of the structural assembly of a thermocouple according to the invention that is connected to an automatic controller via terminal lines.

The first conductor 20 has—as shown in FIG. 2—a first end 21 and a first terminal 22, while the second conductor 30 has a second end 31 and a second terminal 32, wherein the first end 21 of the first conductor 20 and the second end 31 of the second conductor 30 are electrically connected to one another at the measurement point 40, such in that the two ends 21, 31 overlap each other. The first terminal 22 of the first conductor 20 and the second terminal 32 of the second conductor 30 are, on the other hand, connected to one terminal line 23, 33 15 each, the same leading to an automatic controller 50 in order to close the circuit that is necessary for temperature sensing.

The two conductors 20, 30 must be made of different metallic alloys in order to be able to sense the temperature.

For example, the first conductor 20 is made of an alloy of 80% to 95% Ni, 3% to 20% Cr, 0% to 1% Fe and 0% to 1% Si, which is commercially available under the brand name ISATHERM PLUS®. The second conductor 30 is made of an alloy of 40% to 58% Cu, 40% to 50% Ni, 1% to 5% Mn and 1% to 5% Fe, which are commercially available under the brand name ISA MINUS®. The terminal lines 23, 33 are made of the same material as the conductors 20 and/or 30 that are allocated thereto, respectively.

If the temperature of the substrate 60 changes, an electric voltage is generated at the measurement point 40 where the two conductors 20 and 30 form the overlap; said voltage can be measured by the controller that is in electrical contact with the conductors 20, 30 via the terminal lines 23, 33.

The thermocouple 10 according to the invention senses constant voltage changes that are proportionate in relation to the temperature change at the measurement point 40. This way, based on the voltage change that is sensed at the measurement point 40, it is possible to draw conclusions as to a relative change in temperature. If the controller 50 is also used to sense, in addition, the environmental temperature as a reference value, such as, for example, with an internal separate temperature sensor, it is also possible to calculate an absolute temperature change at the measurement point 40 and display the same directly.

To ensure that the thermocouple 10 only has a minimal space requirement, the metallic conductors 20, 30 are mounted via thick-film technology to the substrate 60. This way, the conductors 20, 30 only have a thickness of very few micrometers; meaning, the actual dimensions of the total thermocouple 10 are, in essence, prescribed by the dimensions of the substrate, which constitutes a stable carrier for the metallic conductors protecting the thermocouple 10 from damage and allowing the thermocouple 10 to be mounted on an object that is to be measured.

The production of the metallic conductors 20, 30 is achieved, for example, by way of a screen printing technique. To this end, a first screen printing paste is produced initially for the first conductor 20 that is made from ISA-THERM PLUS®, and the same is applied to a defined area to the substrate 60 by means of screen printing. A second screen printing paste is then produced for the second conductor 30 that is made from ISA MINUS®, and the same is also applied by means of screen printing to a defined area on the substrate 60, wherein the first end 21 of the first conductor 20 and the second end 31 of the second conductor 30 overlap at least in sections at the location of the measurement point 40.

To produce the screen printing paste for the conductors 20, 30, first, it is preferred that a powder be produced, and wherein the respective alloy is melted and subsequently atomized while an inert gas is supplied. During this, a powder comprised of metallic particles forms from which, subsequently, the respective screen printing paste is obtained by adding a solvent.

This method for obtaining the screen printing pastes allows for generating small metallic particles of a homogenous composition and distribution. Moreover, using this method, it is possible to achieve a relatively uniform size distribution of the individual metallic particles. Moreover, the atomized metallic particles have a spherical conformation, thereby providing good flow behavior in the then following screen printing process, thus producing good screen printing results.

The particle sizes of the metallic powder should be as similar as possible; deviations should be ideally within a range of 25%. Proportionately relative to the smallness of the particle sizes, it is possible to select lower sintering temperatures and abbreviated sintering times. Therefore, advantageous particle sizes are 5 micrometers. However, it is also easily possible to use particle sizes between 20 and 25 μm.

Other methods are also conceivable as options for the production of the screen printing paste; these are, for example, the mechanical break-down of alloys, such as, for example, by a grinding process.

The screen printing paste is thus made up of a mixture comprised of a functional component, namely the respective alloy for the first or the second conductor 20, 30, as well as an organic vehicle. The latter has the task of providing the screen printing paste with the desired rheological properties. Furthermore, it is also necessary to ensure, additionally, a stable homogenous dispersion of the functional component in the screen printing paste, with long-term durability.

The solvent is preferably an organic solvent, wherein this is an alcohol and ester mixture; a mixture of ethanol and ethyl acetate is preferred. This combination offers the advantage that it is highly volatile. An aqueous glycol mixture is also conceivable for use as a solvent. Similarly, terpineol can be used as a thinning agent.

The solvent mixture is removed from the screen printing paste in a subsequent drying step, after the screen printing step involving the metal pastes is complete. This drying step can be carried out after each screen printing of the respective screen printing paste; or it can be implemented in conjunction after both printing steps, preferably, however, prior to the sintering step to provide the organic solvent with a chance to evaporate prior to the sintering process. The drying process can be achieved at room temperature or, in an accelerated fashion, at negative pressure or elevated temperature, preferably at 50° C. and 250° C. Drying under a flow of air is also possible.

In one advantageous embodiment of the screen printing pastes, the value of mixing in a long-chained polymer has been demonstrated. The addition of this long-chained polymer, such as, for example, ethyl cellulose ECT-10 0100 by Hercules, to the thinning agent and/or solvent ensures consistently good dispersion of the metallic particles within the screen printing paste.

After printing the individual screen printing pastes for the first conductor 20 and the second conductor 30 on the substrate 60, followed by the subsequent drying step of the printed patterns, both conductors are sintered and/or baked in a subsequent process step that is carried out at a defined temperature and for a preset period of time.

The sintering step is advantageously implemented at a temperature above 700° C., preferably at a temperature between 750° C. and 900° C., particularly preferred at a temperature between 800° C. and 875° C. It is important to consider in this context that the sintering temperature must be high enough for the metallic particles to bind to each other at least in part and, preferably, to be baked to the substrate 60. The sintering step is ideally carried out under a protective gas or hydrogen atmosphere, as the screen printing pastes that were produced from the aforementioned alloys contain metals that are susceptible to oxidation, such as, for example, Ni, Cu and Fe, and that oxidize quickly indeed at the temperatures that are used for sintering, thus forming the corresponding oxides. Usable protective gases are inert gases, such as, for example, argon or nitrogen. However, hydrogen or gas mixtures are also usable, such as nitrogen/hydrogen mixtures or mixtures of air and a protective gas. This means that the gas atmosphere must not necessarily consist of pure inert gases or reductive gases. Rather, this atmosphere can also contain an air portion.

The time window for the sintering process is at least 150 min. Preferably, sintering occurs during a time period of 160 to 200 minutes, particularly preferred over a period of time of 170 to 190 min; the latter option is chosen, in particular, when the sintering temperature must be maintained at a low level. This way, optimal melting and baking of the screen printing paste into the substrate is made possible.

Overall, it is possible to print both conductors 20, 30 simultaneously, drying and baking them afterwards. Alternately, it is also possible to print the first conductor 20 first, drying and sintering the same, followed by the second conductor 30 that is prepared in the same manner. Separate sintering has the advantage that both conductors 20, 30 can be baked and/or sintered at different temperatures.

The substrate 60 is manufactured, for example, of a ceramic or a metal. It must substantially have the desired mechanical properties in order to be able function as a stable carrier, which is also easy-to-handle, for the thermocouple. Moreover, it must be able to withstand the temperatures that are necessary for the sintering processes without suffering damage.

Figure 3:
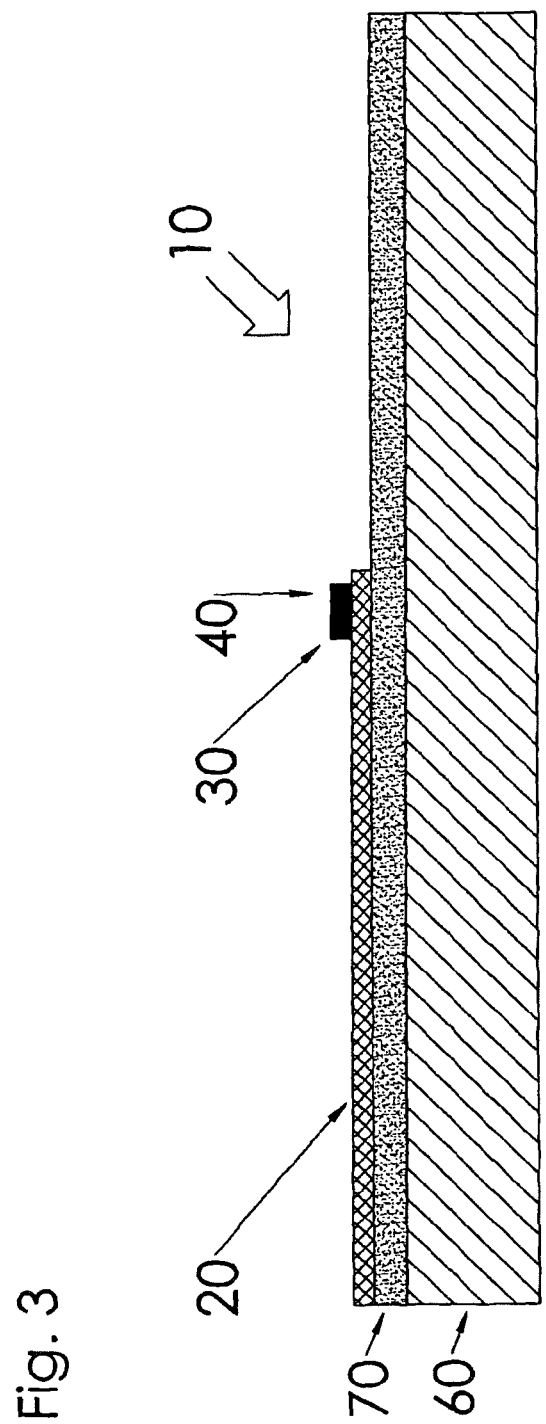
FIG. 3 shows a schematic partial cross-section of another embodiment of the thermocouple according to the invention.

FIG. 3 shows a schematic representation of a cross-section of another embodiment of a thermocouple 10 that also has a layered arrangement of a substrate 60 with a first conductor 20 and a second conductor 30. However, presently, an additional insulation layer 70 is disposed between the substrate 60 and the conductors 20, 30; the same is an electric separator for the substrate 60 from the conductors 20, 30. Correspondingly, it is possible to manufacture the substrate 60 from an electrically conducting material, such as, for example, a metal.

The substrate 60 once again constitutes the carrier element for the layered arrangement of the metallic conductors 20, 30 that are applied in thick-film technology, wherein the insulation layer 70 is also applied in thick-film technology. Therefore, the insulation layer 70 is preferably a dielectric layer.

When manufacturing the thermocouple according to the invention 10, the insulation layer 70 is applied first to the metallic substrate 60 via thick-film technology, dried and baked to the carrier in a subsequent sintering process. The two metallic conductors 20, 30—as described above—are then printed on, dried and baked in. It is important herein that the sintering temperature for the two conductors 20, 30 is below the sintering temperature for the baking-in step of the insulation layer 70.

Figure 4:
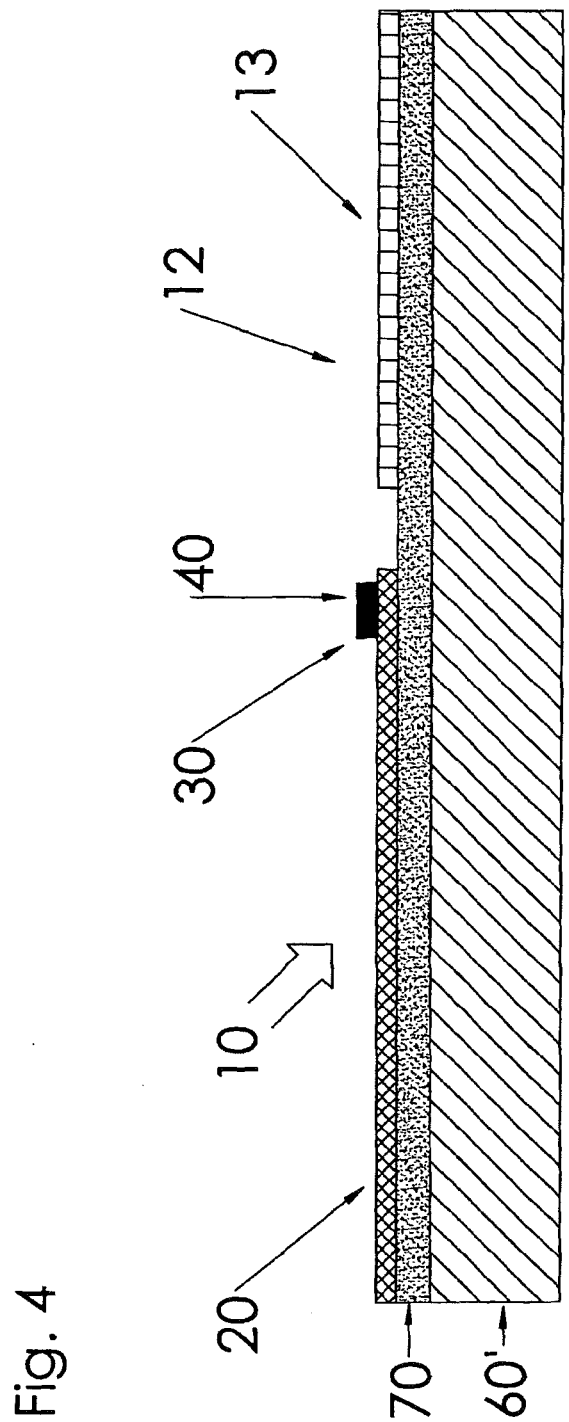
FIG. 4 shows a partial cross-section of a thick-film heater with a thermocouple according to the invention, seen in a schematic view.

FIG. 4 depicts, by way of a schematic representation, a partial cross-section of a thick-film heater 12 with a thermocouple according to the invention 10. The thick-film heater 12 is usually employed for heating a (not shown) hot runner nozzle. The same has a tubular carrier casing 60' to which an insulation layer 70 is applied by means of thick-film technology. Also configured thereon are resistive tracks 13, also using thick-film technology, which are disposed in a defined pattern in order to maintain the melt that is guided inside the hot runner nozzle at an, in as much as this is possible, even temperature over the total length of the nozzle.

Aside from the resistive tracks 13 of the thick-film heater 12, the metallic conductors 20, 30 are applied to the insulation layer 70, also by means of thin-film technique. The conductors are thus disposed in the same plane as the resistive tracks 13, such that the structural height of the thick-film heater 12 is not increased due to the application of the metallic conductors 20, 30.

It can be seen in the drawing that the carrier casing 60' and the insulation layer 70 together constitute the carrier, and thus the substrate for the thermocouple 10. The same is therefore integrated in the thin-film heater 12 and does not have to be assembled as a separate component to the thick-film heater 12 in a separate manufacturing or mounting step.

The hot runner nozzle usually has a (presently not shown) material tube, and the carrier casing 60' of the thick-film heater 12 is pushed onto the outer circumference thereof. Alternately, it is also possible to apply the insulation layer 70 and the resistive tracks of the thick-film heater 12 directly to the material pipe. The same applies correspondingly with regard to the metallic conductors 20, 30 of the thermocouple 10.

The manufacture of the screen printing pastes, as well as the printing action of the individual layers, followed by the subsequent drying action and sintering is achieved as described previously.

However, one important option in the context of this embodiment is the fact that the resistive tracks 13 of the thick-film heater 12 and the metallic conductors 20, 30 of the thermocouple 10 can be printed and sintered simultaneously or consecutively.

Sintering the resistive tracks 13 and the metallic conductors 20, 30 consecutively means that it is possible to bake the metallic conductors 20, 30 at a higher temperature than the resistive tracks 13, and vice versa. This way, the use of alloys with considerably higher baking temperatures can be employed as conductors 20, 30, in contrast to the resistive tracks 13 of the thick-film heater 12. Using higher heat fusing temperatures on the conductors 20, 30 also allows for reducing the baking times for the same. In each of these cases, the process of forming the metallic conductors 20, 30 for the thermocouple 10 no longer influences the manufacturing process of the thick-film heater 12, particularly the resistive tracks 13.

If the carrier casing 60' is made of a non-conducting material, such as, for example, aluminum oxide, zirconium oxide, silicon nitrite or another ceramic, the metallic conductors 20, 30 for the thermocouple 10 and the resistive tracks 13 for the heating element 12 can be applied directly to the carrier casing 60'. However, if the same is made of a metallic material, the insulation layer 70 is applied and baked in first.

FIG. 5 is a schematic representation of another embodiment of the layered configuration of the thermocouple according to the invention 10 on thick-film heater 12 for a hot runner nozzle.

First, the insulation layer 70 is applied in thick-film technology to the carrier casing 60', which is in most cases manufactured from a steel alloy. The same also carries resistive tracks 13, which are also applied in thick-layer technology and disposed in a defined pattern in order maintain the melt that is guided over the hot runner nozzle at an, in as much as possible, even temperature over the total length of the nozzle. A further insulation layer 70' is applied over the resistive tracks 13 of the thick-layer heater 12, which is also executed in thick-film technology. The metallic conductors 20, 30 of the thermocouple are disposed on top of the further insulation layer 70' and overlap at the measurement point 40.

It can be derived from this embodiment that the substrate of the thermocouple 10 is constituted of the resistive tracks 13 of the thick-film heater 12; this means that, presently as well, the thermocouple 10 is integrated in the thick-film heater 12, which has a beneficial effect for the space requirements of the heater 12.

To produce such an arrangement, the thick-film heater 12 is applied first, using thick-film technology, to the carrier casing 60' and baked in by means of a sintering process step. Subsequently, the layered structural assembly is provided with a further insulation layer 70'. The two conductors are then 20, 30 and printed thereon and also baked in the further insulation layer 70', over the thick-film heater 12, in a sintering process step. To be noted herein is the fact that the sintering temperature for the heater 12 must be greater than that for the two conductors 20, 30 constituting the thermocouple according to the invention 10.

The carrier casing 60' can, presently as well, already be the material pipe for a hot runner nozzle; meaning, the thick-film heater 12 and the thermocouple 10 are integral structural components of the hot runner nozzle.

FIG. 6 depicts a schematic partial cross-sectional representation of a (presently not designated in further detail) hot runner nozzle with a material pipe 60" and a thermocouple according to the invention 10.

The material pipe 60" of the hot runner nozzle first supports an insulation layer 70, preferably a dielectric layer, to which the metallic conductors 20, 30 for the thermocouple 10 are applied directly. The same are then covered and insulated by a further insulting layer 70' in order to be able to apply the electrically conducting resistive tracks 13 of a thick-film heater 12 directly thereupon.

Correspondingly, this embodiment provides for the resistive tracks 13 of the thick-film heater 12 to be disposed over the metallic conductors 20, 30 of the thermocouple. This way, it is possible to use alloys for the metallic conductors 20, 30 that require higher baking temperatures than the resistive tracks 13. Similarly, it is possible to use higher baking temperatures to reduce the baking times.

Alternately, it is possible for the metallic conductors 20, 30 to be formed over the resistive tracks 13.

The totality of the layers of this embodiment are executed by means of thick-film technology, such that the exterior dimensions of the material pipe 60" of the hot runner nozzle are only insubstantially enlarged due to the thick-film heater 12 and the thermocouple 10.

To protect and insulate the thick-film heater 12 as well as the thermocouple 10 against external influences, a cover layer 80 is then applied in thick-film technology in a final step over the heater 12. This layer protects the structural layer assembly against scratches, corrosion or other harmful environmental influences. Moreover, this final cover layer 80 can also serves as a thermal insulation toward the outside.

This cover layer 80 is preferably made of glass, wherein the glass can be quartz glass, boron silicate glass, crown glass, lime-soda glass, float glass, flint glass, etc., and that can contain various additives, if necessary, such as, for example, zinc oxide, boron oxide or aluminum oxide and/or further additives such as, for example, iron oxides, copper oxides, cobalt oxides, chromium oxides, uranium oxides, nickel oxides, selenium oxides and/or manganese (IV) oxides. This cover layer 80 is intended to protect the conductor against corrosion and other damage or harmful environmental influences.

The cover layer 80 is applied in the same manner as all the other layers by means of screen printing. To this end, a screen printing paste is produced from the material that is to constitute the cover layer; then, said material is applied by means of a screen printing step onto the first and second conductors, at least in part. Alternately, it is also possible to print the cover layer onto an applied heater or an insulation layer.

Following a possible drying step, after the same has been applied, the cover layer 80 is sintered. This causes the cover layer 80 to be baked to the already existing layers and thereby rendering it able to protect these lower layers against external influences, possibly acting like an additional insulation layer. Finally, the sintering step is carried out at least at 450° C., preferably at a temperature of 500° C. to 580° C., and particularly preferred at a temperature of 525° C. to 560° C. To protect a conductor 20, 30 that may not be covered against oxidation, sintering occurs under a protective gas atmosphere. Also possible are glasses that require substantially baking temperatures.

To bake the cover layer 80 into the substrate, the conductor, the heater or the insulation layer, as final and very brief sintering step follows. The cover layer 80 therein can be sintered for a time period of seven to twelve minutes, preferably a time period of ten minutes, in order to prevent the previously applied layers from suffering damage.

The invention is not limited to the aforementioned embodiments; instead, the invention can be varied in many different ways. For example, the metallic conductors 20, 30 can be made of different alloy combinations. For example, the conductors 20, 30 can, in one embodiment, be made of ISA MINUS® and ISA PLUS®, ISATHERM MINUS® and ISATHERM PLUS® or ISATHERM MINUS® and ISA PLUS®. The alloy designations as used above are brand names of the Isabellenhütte Heusler GmbH & Co KG, Dillenburg, Germany.

In the above alloys, it is optionally possible to substitute silicon with germanium, or manganese with rhenium, as these have comparable chemical properties.

By creating a targeted contact of the metallic conductor 20, 30 with a metallic conducting substrate, it is possible to electrically ground the thermocouple 10. The contact can be either achieved by providing a passage through in the insulting layer 70 or by an overlap of the metallic conductors 20, 30 beyond the dielectric layer onto the substrate 60.

Conceivable thick-film technology methods are—as outlined above—screen printing, thermal spraying, dabber printing, laser sintering or aerosol printing.

However, it can be seen that the invention includes a thermocouple 10 for sensing the temperature at a measurement point 40, having a first conductor 20, which has a first end 21 and a first terminal 22, and having a second conductor 30, which has a second end 31 and a second terminal 32, and wherein the first end 21 of the first conductor 20 and the second end 31 of the second conductor 30 are in electrical contact with one another at the measurement point 40, and wherein the first terminal 22 of the first conductor 20 and the second terminal 32 of the second conductor 30 can each be connected to a terminal line 23, 33, wherein the first conductor 20 and the second conductor 30 are applied in thick-film technology to a substrate 60, and wherein the first end 21 of the first conductor 20 and the second end 31 of the second conductor 30 overlap at least in sections at the measurement point 40.

The essential benefits of the invention are as follows:

A geometry that barely rises above the measured object (only by a few micrometers);

Nevertheless offering mechanical stability, same as the substrate to which it is printed;

Minimal thermal mass, therefore extremely fast response time;

If integrated in a thick-film heater, no requirement of any additional structural assembly;

DIN-compliant and/or similar measured signal (deviation of less +/−5%);

Small and clearly defined measurement point (particularly for heaters having inhomogeneous output and/or temperature distribution).

The totality of the characteristics and benefits that can be derived from the claims, the description and the drawings, including structural details, spatial arrangements and method steps, can be essential according to the invention either as stand-alone features or in various combinations.

| List of Reference Signs | |
| --- | --- |
| 10 | Thermocouple |
| 11 | Heater |
| 12 | Thick-film heater |
| 13 | Resistive tracks |
| 14 | Slots |
| 15 | Grooves |
| 20 | First conductor |
| 21 | First end |
| 22 | First terminal |
| 23 | First terminal line |
| 24 | First contact point |
| 25 | 1st conductor + further measurement point |
| 30 | Second conductor |
| 31 | Second end |
| 32 | Second terminal |

-continued

| | List of Reference Signs |
|---|---|
| 33 | Second terminal line |
| 34 | Second contact point |
| 35 | 2$^{nd}$ conductor + further measurement point |
| 40 | Measurement point |
| 50 | Controller |
| 60 | Substrate |
| 60' | Carrier casing |
| 70 | Isolation layer |
| 70' | Further insulation layer |
| 80 | Cover layer |

The invention claimed is:

1. A thermocouple (10) for sensing temperature at a measurement point (40), having a first conductor (20), which has a first end (21) and a first terminal (22), and a second conductor (30), which has a second end (31) and a second terminal (32), wherein the first end (21) of the first conductor (20) and the second end (31) of the second conductor (30) are in electric contact with one another at the measurement point (40), and wherein the first terminal (22) of the first conductor (20) and the second terminal (32) of the second conductor (30) are connected to a terminal line (23, 33), characterized in that the first conductor (20) and the second (30) are applied to a substrate (60) using thick-film technology, wherein the first end (21) of the first conductor (20) and the second end (31) of the second conductor (30) overlap at least in sections at the measurement point (40), wherein the first conductor (20) constitutes a positive contact and is manufactured of an alloy made of 80% to 95% Ni, 3% to 20% Cr, 0% to 1% Fe and 0% to 1% Si, and in that the second conductor (30) constitutes a negative contact and is manufactured of an alloy made of 40% to 58% Cu, 40% to 50% Ni, 1% to 5% Mn and 1% to 50/Fe.

2. The thermocouple (10) according to claim 1, characterized in that an electrical insulation layer (70) is disposed between the substrate (60) and the conductors (20, 30).

3. The thermocouple (10) according to claim 1, characterized in that a cover layer (80) is applied at least in sections over the conductors (20, 30) and the insulation layer (70).

4. The thermocouple (10) according to claim 1, characterized in that the substrate (60) is manufactured of a heat-conducting material.

5. The thermocouple (10) according to claim 1, characterized in that the substrate (60) is or forms a carrier element.

6. The thermocouple (10) according to claim 1, characterized in that a heater (11) is disposed on the substrate (60) using thick-film technology.

7. The thermocouple (10) according to claim 1, characterized in that the substrate (60) is part of a hot runner nozzle (90).

8. The thermocouple (10) according to claim 7, characterized in that the substrate (60) is a heater (11) of the hot runner nozzle (90).

9. The thermocouple (10) according to claim 8, characterized in that the heater (11) is a thick-film heater (12) with resistive tracks (13).

10. The thermocouple (10) according to claim 1, characterized in that the conductors (20, 30) of the thermocouple (10) and the resistive tracks (13) are separated from each other by mechanical slots (14) or grooves (15).

11. A hot runner nozzle (90) with a heater (11) and a thermocouple (10) according to claim 1.

12. The hot runner nozzle according to claim 11, characterized in that the heater (11) is a thick-film heater (12) with resistive tracks (13), wherein the thermocouple (10) is disposed above the resistive tracks (13), below the resistive tracks (13) or in the same plane as the resistive lines (13).

13. The hot runner nozzle according to claim 12, characterized in that an insulation layer (70) is provided between the resistive tracks (13) of the heater (11) and the thermocouple (10).

14. The hot runner nozzle according to claim 11, characterized in that a cover layer (80) is provided over the heater (11).

* * * * *